Sept. 10, 1974   G. A. PUTNEY   3,834,927
FLUIDIZED BED COATING METHOD
Filed July 27, 1973
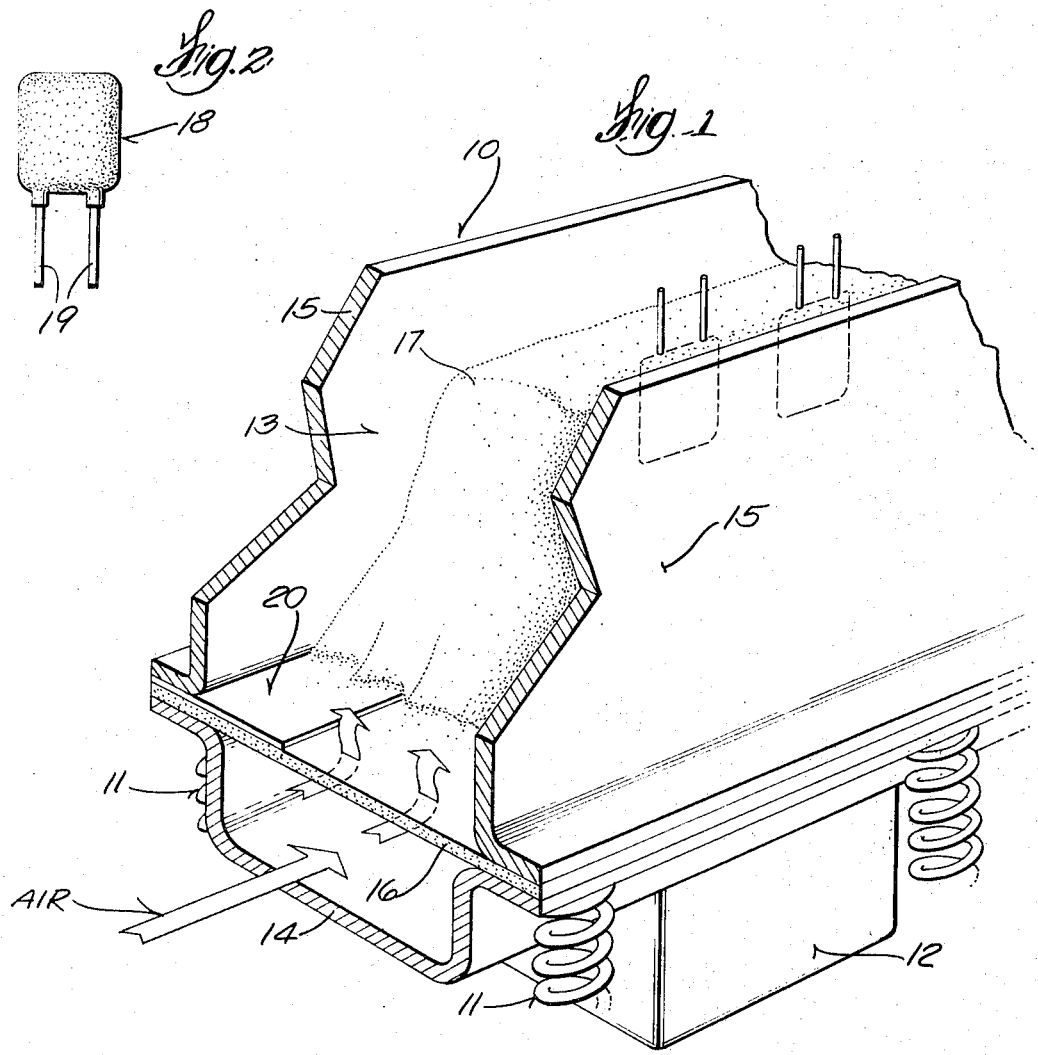
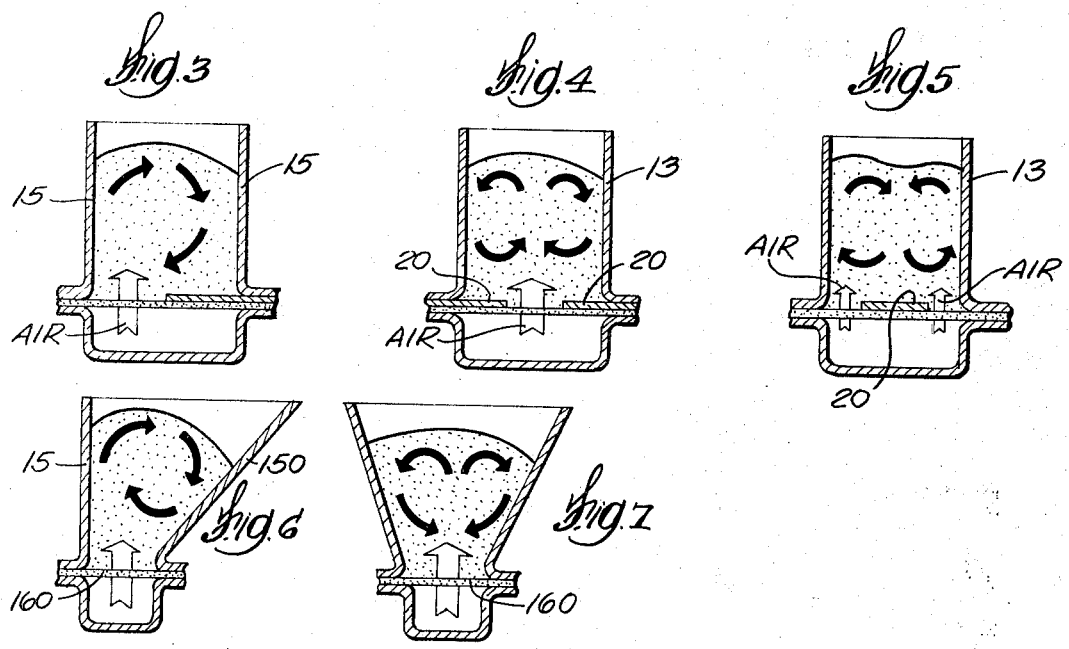

United States Patent Office 3,834,927
Patented Sept. 10, 1974

3,834,927
FLUIDIZED BED COATING METHOD
Gordon A. Putney, New Berlin, Wis., assignor to Koerper Engineering Associates, Inc., Milwaukee, Wis.
Continuation-in-part of abandoned application Ser. No. 163,312, July 16, 1971. This application July 27, 1973, Ser. No. 383,381
Int. Cl. B44d 1/095
U.S. Cl. 117—21                    5 Claims

ABSTRACT OF THE DISCLOSURE

A bed of heat fusible plastic material in pulverulent or particulate form is fluidized by simultaneously vibrating it and aerating the same from the bottom. Aerating gas is constrained to enter the bottom of the bed at a localized influx zone that is smaller in area than the upper free surface of the bed. The influx zone is situated to effect continuous migration of the pulverulent or particulate material along a generally circular path, a portion or component of which extends horizontally through the upper strata of the bed, to thereby prevent the formation of geysers and define a smooth upper free surface for the bed.

This invention, like that of the copending application Ser. No. 163,312, now abandoned, of which the instant application is a continuation-in-part, relates to the fluidized bed coating art, and refers more specifically to the adaptation of that technique to the coating of preheated articles by dipping them a predetermined distance into a bed of the heat fusible pulverulent or particulate material maintained in a fluidized state in a suitable vessel.

Fluidized bed coating, although available for some time—as evidenced by the Gemmer Pats. Nos. 2,844,489, 2,974,059 and 3,183,113; the Dettling Pats. Nos. 2,974,060, 2,987,413 and 3,226,245; the Nagel Pats. Nos. 2,981,631 and 3,140,195; the Croessant et al. Pat. No. 3,085,034; and the Angstadt Pat. No. 3,233,584—has not heretofore been successfully employed on a mass production basis in the application of insulative coatings to electronic components having lead wires which must remain uncoated beyond a point closely adjacent to the surface of the component from which they protrude.

The fluidized bed coating technique of course involves the introduction of a fluidizing gaseous medium—often just air—into a bed of heat fusible, pulverulent or particulate coating material such as powdered vinyl and powdered epoxy resins.

The fluidizing gas has always been introduced into the bottom of the bed through a porous plate, the porosity of which was such that the gas entering the bed was uniformly distributed over the entire bottom area of the bed.

As aptly described in the Beike Pat. No. 3,364,053, issued in 1968, with the fluidized bed technique available at the time of his invention, a uniform coating on the articles and objects to be coated could not be assured, even where the objects were completely immersed. As pointed out by Beike, channeling of the fluidizing gases was quite common, with the result that the gases emerging from the channels formed fountains of coating material, commonly referred to as "geysers." Beike found these geysers objectionable, even though he was not concerned with dip type coating. He explains that the material elutriated from the bed by the geysers adhered firmly to the still tacky coating layer on the articles as they were removed from the bed and, in so doing, impaired the coating. He also states that the geysers produced dust which caused a loss of coating material and an annoyance to the operating personnel.

Beike's answer to the objections of the then prior fluidized bed coating technique was to effect continuous mixing of the powder particles either by (1) moving a paddle back and forth with a horizontal reciprocating motion, or in a pendulum-like fashion over and adjacent to the porous gas distributing plate or partition; or (2) effecting removal of a portion of the pulverulent material at one level of the bed and simultaneously introducing at least an equal amount of the material at a lower level.

By either of these two rather different procedures, Beike claims to have improved upon an earlier attempt to eliminate geysers by moving parallel sheet metal strips back and forth horizontally at a slight distance above the gas distributing plate. Although Beike does not identify that prior practice—which he found to be inadequate, especially when the fluidized bed was rather deep, under which condition he considered that prior expedient to be practically without effect—he probably had reference to the procedure followed in the earlier Tompson Pat. No. 3,167,454.

Tompson was apparently the first to have sought a smooth free upper surface for a fluidized bed with a view to making it possible to control the extent to which an article, such as an electronic component, would be coated. His observation that the nature of the turbulence caused by the geysers erupting from the surface of the bed gave it the resemblance of a container of boiling water, graphically defined the problem which he sought to overcome. His solution consisted in agitating the fluidized material to physically displace particles thereof and thereby establish low resistance paths for the fluidizing gas—which paths led away from the preselected area of the fluidized material into which the articles to be coated were introduced.

Like that of the Tompson patent, the present invention also has as its purpose to achieve a smooth upper free surface for a fluidized bed of heat-fusible pulverulent coating material, but in a way which gives the entire area of that surface the desired uninterrupted smoothness, so that the simultaneous coating of a plurality of articles to a uniform extent is not only possible but reliably repeatable on a mass production basis.

The object of this invention is thus to provide an improved method of producing a fluidized bed of heat-fusible powdered material which eliminates all of the objections to prior methods of producing and maintaining a fluidized bed.

With the above observations and objectives in mind, the manner in which the invention achieves its purpose will be appreciated from the following description and the accompanying drawing, which illustrates several examples of the apparatus employed in the practice of the invention, constructed according to the best modes so far devised for the practical application of the invention, it being understood that changes may be made in the illustrated apparatus without departing from the essentials of the invention set forth in the appended claims.

In the drawing:

FIG. 1 is a fragmentary perspective view illustrating the preferred form of the apparatus employed in the practice of this invention, parts thereof being broken away and shown in section;

FIG. 2 is an elevational view of a typical article to be coated;

FIG. 3 is a cross sectional view, at a reduced scale, through the structure shown in FIG. 1, and illustrating one embodiment of the invention;

FIG. 4 is a view similar to FIG. 3 but illustrating another embodiment of the invention;

FIG. 5 is a cross sectional view, also similar to FIG. 3, but illustrating still another embodiment of the invention; and FIGS. 6 and 7 are cross sectional views, generally similar to FIG. 3, illustrating two additional embodiments of the invention.

Referring now to the accompanying drawing, the numeral 10 generally designates an apparatus in which the method of this invention can be practiced to advantage. Though only a portion of the apparatus has been shown, it will be understood that it comprises a substantially long and narrow trough-like container or vessel 13, resiliently supported for vibratory motion on a number of coil springs 11. The vibratory motion can be imparted to the container or vessel by a number of vibrators 12, only one of which is shown. These vibrators may be of the inertia, mechanical, air or magnetic type.

The trough-like vessel 13 has opposite upright side walls 15 which are parallel to one another, a bottom wall 16 and end walls, not shown.

The heat fusible pulverulent or particulate material substantially fills the trough-like container and provides the bed 17 into which the parts to be coated are dipped. The material comprising the bed 17 can be one of the kinds ordinarily employed in the coating of electrical components—epoxy or other materials having suitable electrical insulating properties being commonly used for that purpose. An example of the type of components, the coating of which is the concern of this invention, is illustrated in FIG. 2. The component there shown has a body 18, all surfaces of which are coated, and wire leads 19 projecting from the body and coated only at their base portions; it being important that beyond a predetermined distance from the point at which the lead wires emerge from the body, they be uncoated and clean.

The bottom wall 16 of the trough-like vessel is formed by an air previous or porous plate of a well known type heretofore employed in the fluidized bed art, and usually termed a gas distributing plate, since it effects dispersion of the aerating fluid entering the bottom of the bed from a plenum chamber therebelow. In this case, the plenum chamber is formed by a pan 14 secured to the underside of the trough-like container, and provided with a suitable inlet (not shown) through which the aerating or fluidizing gas enters at a selected pressure.

Heretofore, in the fluidized bed coating art, great pains were taken to have the fluidizing gas rise uniformly through all portions of the bed, which of course entailed having the gas enter the bottom of the bed at the same rate across the entire area of the porous distributing plate. But that condition was most difficult to achieve and seldom could be maintained. Geyser-forming channeling was practically always inevitable, so that the upper free surface of the bed was anything but smooth and uniformly level. It was that inescapable disadvantage of the conventional fluidized bed coating technique which Tompson (Pat. No. 3,167,454) and Beike (Pat. No. 3,364,053) sought to avoid by moving paddles back and forth in the bed, or by drawing off material at one level and reintroducing it at another level. Whether or not those expedients produced the results sought can be questioned, but the fact that they required power driven mechanisms constituted a significant deterrent to their adoption.

By this invention, what Tompson and Beike sought has been attained in a much simpler way.

The invention resides in the discovery that when the entry of the fluidizing gas is restricted to an area of the bottom of the bed that is significantly smaller than the area of its upper free surface and the entire bed is vibrated, the bed is uniformly fluidized and the fluidized particles continually migrate or circulate in or along a closed path that has an upward component, a downward component and a horizontal component in the upper strata of the bed. By that continuous circulation of the fluidized particles, horizontal shear planes are produced in the upper strata of the bed which break up any vertically ascending column of fluidizing gas, and thereby effectively prevent geysering and define a smooth upper free surface for the bed. Obviously to achieve this condition and assure optimum results, the pressure at which the fluidizing gas enters the bed must not be so great as to cause spouting such as that which is utilized in the grain drying method of the Gishler et al. Pat. No. 2,786,280 and the particle coating method of the Heiser et al. Pat. No. 3,112,220, and which spouting produces a fountain of the particles at the top of the bed with the particles falling from the fountain onto the top of the bed surrounding the spout. But the selection of suitable pressure at which the fluidizing gas enters the bed, as well as the optimum frequency and amplitude of the vibration imparted to the bed, poses no difficultly. Any reasonably skilled operator can easily effect the needed adjustments. Mere observation of the surface of the bed will guide the operator to the most effective combination of aeration and vibration for any particular material.

The necessary constriction of the influx zone is easily accomplished in the apparatus illustrated in the drawing by blocking off part of the area of the porous distributing plate 16 as by a masking member 20 that extends for the full length of the trough-like container 13, but is narrower than its width. In FIG. 3, the masking member closes the right-hand side portion of the porous distributing plate so that the fluidizing gas enters the bed adjacent to the left side wall 15, as shown by the wide double line arrow. Accordingly, in this embodiment of the invention, the migration of the particles, as depicted by the solid line arrows, is upward at the left-hand side of the bed, transversely through the upper strata of the bed, and downward at the right-hand side of the bed.

In those embodiments of the invention illustrated in FIGS. 4 and 5, the particles circulate or migrate along two side-by-side closed paths. In FIG. 4—the air admission zone being at the center of the bed, i.e. equispaced from its opposite sides—the particles move upward at the center, then transversely in opposite directions in the upper strata of the bed towards the opposite sides thereof, and then downward at the sides of the bed.

In FIG. 5, the fluidizing air enters through two narrow admission zones that are adjacent to the sides of the bed, and as a result the fluidized particles move upward at the sides of the bed, inwardly towards the center of the bed in its upper strata, and downwardly at the center.

In each of the three ways of practicing the invention shown in FIGS. 3, 4, and 5, the side walls 15 of the trough-like container or vessel 13 are parallel to one another, and hence to gain the needed difference in area between the gas influx zone and the upper free surface of the bed, part of the width of the porous distributing plate is blocked off. The same needed area differential can also be obtained in the manner illustrated in FIGS. 6 and 7, wherein no part of the distributing plate 160 is blocked off.

In FIG. 6, the downwardly and inwardly sloping disposition of the right-hand side wall 150 achieves the needed area differential between the influx zone and the upper free surface of the bed, so that—as depicted by the arrows—the circulation path of the fluidized particles is the same as it is in FIG. 3.

In the FIG. 7 embodiment, both side walls of the vessel containing the bed slope downwardly and inwardly, and hence there are two circulation paths, as in FIG. 4.

In all of the illustrated ways of practicing the invention, it is the combined effect of vibrating the entire bed by imparting vibration to the elongated trough-like container or vessel 13 and the circulation resulting from having the fluidized gas enter the bottom of the bed at a zone that is substantially narrower than the upper free surface of the bed, that defines or assures a smooth uninterrupted upper free surface for the bed and maintains the bed in a substantially uniformly fluidized condition.

It has been observed that, in addition to assuring a smooth uninterrupted upper free surface for the bed, the circulatory motion of the particles causes a slight cresting of the upper free surface, as exaggeratedly shown in FIGS. 3–7. As a result of this cresting, the upper free surface of the bed is not flat or uniformly level, but this condition does not preclude coating all of a multiplicity of articles to the same extent by simultaneously dipping them all into the bed. Since the bed density is uniform across its entire width—at least in the upper portion thereof into which the articles are dipped—and the cresting is uniform along the entire length of the bed, a row of articles suspended from a dipping fixture and dipped thereby into the bed, will all be uniformly coated to the same extent, no matter where across the width of the surface of the bed the dipping takes place, as long as the dipping fixture holds the row of articles parallel with the sides of the bed.

Other significant advantages result from the described circulation of the particulate material. Among them are: prevention of stratification or segregation of particles of different size; continuous admixture of the particles to assure substantially uniform distribution of "virgin" material throughout the entire bed cross section; constant cooling of the particles by carrying them away from radiant heat at the surface of the bed; elimination of splatter of powdered material up onto the leads of the articles as they are dipped and withdrawn; reduction in the criticality of humidity control by reason of uniform drying of powder; and unprecedented smoothness in the free surface of the fluidized bed.

While the container for the fluidized bed is preferably a straight, elongated trough—as illustrated in FIG. 1—the method of this invention is also susceptible to being practiced with a cylindrical vessel or container for the fluidized bed. In that case, the fluidizing gas enters the bottom of the bed either at the center or through a circular admission zone adjacent to the circumference of the bed.

Those skilled in the art will appreciate that the invention can be embodied in forms other than as herein disclosed for purposes of illustration.

The invention is defined by the following claims:

1. A method of simultaneously coating predetermined portion of each of a plurality of preheated articles, which method comprises:
   A. providing a bed of heat fusible pulverulent material;
   B. continuously vibrating the entire bed of said material;
   C. simultaneously effecting migration of the pulverulent material along a closed circular path, one component of which extends transversely through the upper strata of the bed, to thereby maintain at least the upper portion of the vibrating bed in a uniformly fluidized state and define a smooth top surface for the bed, by introducing fluidizing gas into the bottom of the vibrating bed through an admission zone that is substantially smaller in area than the upper free surface of the bed, at a pressure such that the transverse migration of the pulverulent material in the upper strata of the bed breaks up any vertically ascending columns of fluidizing gas before they reach the upper free surface of the bed;
   D. dipping said articles into the fluidized bed; and
   E. withdrawing said articles from the bed.

2. The method of claim 1, wherein said admission zone through which the fluidizing gas enters the bottom of the bed is so disposed beneath the upper free surface of the bed that the pulverulent material forming the transversely moving upper strata of the bed travels from one side edge of the upper free surface of the bed to the other.

3. The method of claim 2, further characterized by utilizing the combined effect of the vibration and the circular migration of the pulverulent material to cause the upper free surface of the bed to crest and assume a convex curvature that is uniform for the entire length of the bed,
   so that a plurality of articles dipped the same distance into the bed anywhere between the side edges of its upper free surface will be coated to the same extent as long as the articles are arranged in a row parallel with the side edges of the upper free surface of the bed.

4. The method of claim 2,
   wherein said admission zone is adjacent to one of said side surfaces of the bed, so that the path of the vibrating pulverulent material has an upward component at said one side of the bed and a downward component at the opposite side thereof.

5. The method of claim 1 wherein the article is an electrical component.

References Cited
UNITED STATES PATENTS

| | | | |
|---|---|---|---|
| 3,573,953 | 4/1971 | Laulan | 117—21 |
| 3,241,520 | 3/1966 | Warster et al. | 117—DIG. 6 |
| 2,795,318 | 6/1957 | Morris | 117—DIG. 6 |
| 2,987,413 | 6/1961 | Dettling et al. | 117—21 |
| 3,437,073 | 4/1969 | Drake et al. | 117—DIG. 6 |
| 2,786,280 | 3/1957 | Gishler et al. | 117—DIG. 6 |
| 2,968,683 | 1/1961 | Kossmamn | 117—DIG. 6 |
| 3,167,454 | 1/1965 | Tompson | 117—DIG. 6 |
| 3,253,944 | 5/1966 | Warster | 117—100 |
| 3,112,220 | 11/1963 | Heiser et al. | 117—100 |

WILLIAM D. MARTIN, Primary Examiner

W. R. TRENOR, Assistant Examiner

U.S. Cl. X.R.

117—22, 23, DIG. 6; 118—DIG. 5